US006998212B2

(12) United States Patent
Shirai et al.

(10) Patent No.: US 6,998,212 B2
(45) Date of Patent: Feb. 14, 2006

(54) CRYSTALLINE POLYESTER

(75) Inventors: Eiji Shirai, Wakayama (JP); Katsutoshi Aoki, Wakayama (JP)

(73) Assignee: Kao Corporation, Tokyo (JP)

( * ) Notice: Subject to any disclaimer, the term of this patent is extended or adjusted under 35 U.S.C. 154(b) by 24 days.

(21) Appl. No.: 10/621,387

(22) Filed: Jul. 18, 2003

(65) Prior Publication Data

US 2004/0023141 A1     Feb. 5, 2004

(30) Foreign Application Priority Data

Jul. 29, 2002  (JP)  ............................. 2002-220223

(51) Int. Cl.
G03G 9/087    (2006.01)
(52) U.S. Cl. ................ 430/109.3; 430/109.4; 528/195; 528/272; 525/418
(58) Field of Classification Search ............. 430/109.3, 430/109.4; 528/272, 195; 525/418, 432, 525/195

See application file for complete search history.

(56) References Cited

U.S. PATENT DOCUMENTS

| 5,948,584 A   * | 9/1999 | Hashimoto et al. ...... 430/109.3 |
| 6,383,705 B1    | 5/2002 | Aoki et al. |
| 6,723,822 B1  * | 4/2004 | Shirai et al. ................ 528/195 |

FOREIGN PATENT DOCUMENTS

| EP | 1 126 324   | 8/2001 |
| JP | 11-305485   | 11/1999 |
| JP | 2001-222138 | 8/2001 |

* cited by examiner

Primary Examiner—John L Goodrow
(74) Attorney, Agent, or Firm—Oblon, Spivak, McClelland, Maier & Neustadt, P.C.

(57) ABSTRACT

A crystalline polyester having a number-average molecular weight of from 5000 to 10000, a weight-average molecular weight of from 150000 to 8000000, a maximum peak temperature of heat of fusion of from 60° to 150° C., and a ratio of a softening point to a maximum peak temperature of heat of fusion (softening point/peak temperature) of from 0.6 to 1.3. The crystalline polyester can be used as a resin binder for a toner used for developing electrostatic latent images formed in electrophotography, electrostatic recording method, electrostatic printing method, and the like.

16 Claims, No Drawings

CRYSTALLINE POLYESTER

FIELD OF THE INVENTION

The present invention relates to a crystalline polyester which can be used as a resin binder for a toner used, for example, for developing electrostatic latent images formed in electrophotography, electrostatic recording method, electrostatic printing method, and the like, and a toner comprising the crystalline polyester.

BACKGROUND OF THE INVENTION

For the purpose of improving the low-temperature fixing ability, which is one of the major problems to be solved in electrophotography, a resin binder for a toner, comprising a crystalline polyester has been studied (Japanese Patent Laid-Open No. 2001-222138).

However, properties which are usually incompatible with low-temperature fixing ability need to be further improved, for instance, storage ability and durability. As an example of the durability, in the case of a two-component development, the prevention of toner spent to a carrier is desired, and in the case of a mono-component development, the prevention of fusion to a blade is desired.

SUMMARY OF THE INVENTION

According to the present invention, there is provided a crystalline polyester having a number-average molecular weight of from 5000 to 10000, a weight-average molecular weight of from 150000 to 8000000, a maximum peak temperature of heat of fusion of from 60° to 150° C., and a ratio of a softening point to a maximum peak temperature of heat of fusion (softening point/peak temperature) of from 0.6 to 1.3. The present invention also provides a toner comprising the crystalline polyester described above as a resin binder.

DETAILED DESCRIPTION OF THE INVENTION

All publications cited herein are hereby incorporated by reference.

The present invention relates to a crystalline polyester, while keeping the low-temperature fixing ability of the toner, is capable of exhibiting excellent properties in its storage property and durability when the crystalline polyester is used as a resin binder for a toner, and a toner comprising the crystalline polyester.

These and other advantages of the present invention will be apparent from the following description.

One of the features of the crystalline polyester of the present invention resides in that the crystalline polyester has a number-average molecular weight within the specified ranges, besides a weight average molecular weight within the specified ranges.

Since the number-average molecular weight of the crystalline polyester gives undesired effects to the storage property when the number-average molecular weight is too low and to the productivity when the number-average molecular weight is too high, the number-average molecular weight is from 5000 to 10000, preferably from 5500 to 9000, more preferably from 6000 to 8000.

In addition, it is preferable that the crystalline polyester contains a polymeric component in a certain amount from the viewpoint of durability. Therefore, the weight-average molecular weight of the crystalline polyester is from 150000 to 8000000, preferably from 300000 to 6000000, and more preferably from 800000 to 5000000.

The polymeric component, especially a polymeric component having a molecular weight of 50000 or more has high elasticity and toughness, and is effective in improving the durability of the toner. The content of the polymeric component is preferably 10% by weight or more, more preferably 10 to 30% by weight, still more preferably 13 to 25% by weight, of the crystalline polyester.

In the present invention, the term "crystalline" means that a ratio of the softening point to the maximum peak temperature of heat of fusion (softening point/peak temperature) is from 0.6 to 1.3, preferably from 0.9 to 1.2, more preferably greater than 1.0 and 1.2 or. Also, the term "amorphous" means that a ratio of the softening point to the maximum peak temperature of heat of fusion (softening point/peak temperature) is greater than 1.3 and 4.0 or less, preferably from 1.5 to 3.0.

The maximum peak temperature of heat of fusion of the crystalline polyester of the present invention is from 60° to 150° C., preferably from 80° to 140° C., more preferably from 100° to 130° C., from the viewpoints of fixing ability, storage property and durability.

The crystalline polyester of the present invention is preferably a resin obtained by polycondensing an alcohol component comprising 60% by mol or more of an aliphatic diol having 2 to 6 carbon atoms, preferably 4 to 6 carbon atoms, and a carboxylic acid component comprising 60% by mol or more of an aliphatic dicarboxylic acid compound having 2 to 8 carbon atoms, preferably 4 to 6 carbon atoms, more preferably 4 carbon atoms.

The aliphatic diol having 2 to 6 carbon atoms includes ethylene glycol, 1,2-propylene glycol, 1,3-propylene glycol, 1,4-butanediol, 1,5-pentanediol, 1,6-hexanediol, neopentyl glycol, 1,4-butenediol, and the like. Among them, an α, ω-linear alkanediol is preferable, and 1,4-butanediol and 1,6-hexanediol are more preferable.

It is desirable that the aliphatic diol having 2 to 6 carbon atoms is contained in the alcohol component in an amount of 60% by mol or more, preferably from 80 to 100% by mol, more preferably from 90 to 100% by mol. Especially, it is desirable that one aliphatic diol occupies 70% by mol or more, preferably from 80 to 95% by mol, of the alcohol component. Above all, it is desirable that 1,4-butanediol is contained in the alcohol component in an amount of preferably 60% by mol or more, more preferably from 70 to 100% by mol, still more preferably from 80 to 100% by mol.

The alcohol component may contain a polyhydric alcohol component other than the aliphatic diol having 2 to 6 carbon atoms. The polyhydric alcohol component includes a divalent aromatic alcohol such as an alkylene (2 to 3 carbon atoms) oxide adduct (average number of moles added being 1 to 10) of bisphenol A, such as polyoxypropylene(2.2)-2,2-bis(4-hydroxyphenyl)propane and polyoxyethylene(2.2)-2,2-bis(4-hydroxyphenyl)propane; a trihydric or higher polyhydric alcohol such as glycerol, pentaerythritol and trimethylolpropane.

The aliphatic dicarboxylic acid compound having 2 to 8 carbon atoms includes oxalic acid, malonic acid, maleic acid, fumaric acid, citraconic acid, itaconic acid, glutaconic acid, succinic acid, adipic acid, anhydrides thereof, alkyl (1 to 3 carbon atoms) esters thereof, and the like, among which fumaric acid and adipic acid are preferable, and fumaric acid is more preferable. Incidentally, as described above, the aliphatic dicarboxylic acid compound refers to an aliphatic dicarboxylic acid, an anhydride thereof and an alkyl (1 to 3 carbon atoms) ester thereof, among which the aliphatic dicarboxylic acid is preferable.

It is desirable that the aliphatic dicarboxylic acid compound having 2 to 8 carbon atoms is contained in the carboxylic acid component in an amount of 60% by mol or more, preferably from 80 to 100% by mol, more preferably from 90 to 100% by mol. Especially, it is desirable that one aliphatic dicarboxylic acid compound occupies 60% by mol or more, preferably 70 to 100% by mol, preferably from 80 to 100% by mol, of the carboxylic acid component. Above all, it is desirable that fumaric acid is contained in the carboxylic acid component in an amount of preferably 60% by mol or more, more preferably 70 to 100% by mol, still more preferably from 80 to 100% by mol.

The carboxylic acid component may contain a polycarboxylic acid component other than the aliphatic dicarboxylic acid compound having 2 to 8 carbon atoms. The polycarboxylic acid component includes aromatic dicarboxylic acids such as phthalic acid, isophthalic acid and terephthalic acid; aliphatic dicarboxylic acids such as sebacic acid, azelaic acid, n-dodecylsuccinic acid and n-dodecenylsuccinic acid; alicyclic dicarboxylic acids such as cyclohexanedicarboxylic acid; tricarboxylic or higher polycarboxylic acids such as trimellitic acid and pyromellitic acid; anhydrides thereof, alkyl (1 to 3 carbon atoms) esters thereof, and the like.

The molar ratio of the carboxylic acid component to the alcohol component (carboxylic acid component/alcohol component) in the crystalline polyester of the present invention is preferably 0.9 or more and less than 1.0, more preferably 0.95 or more and less than 1.0, from the viewpoint of preparation stability and further from the viewpoint of being capable of easily adjusting the molecular weight of the resin by evaporation during a vacuum reaction when the alcohol component is contained in excess.

The polycondensation of a monomer mixture comprising the alcohol component and the carboxylic acid component can be carried out, for instance, by a reaction at a temperature of from 120° to 230° C. in an inert gas atmosphere, using an esterification catalyst, a polymerization inhibitor or the like as occasion demands. Concretely, in order to enhance the strength of the resin, an entire monomer may be charged at once. Alternatively, in order to reduce the low-molecular weight components, divalent monomers may be reacted first, and thereafter trivalent or higher polyvalent monomers may be added and reacted. In addition, the reaction may be accelerated by reducing the pressure of the reaction system in the second half of the polymerization. Incidentally, in order to obtain the crystalline polyester of the present invention, it is preferable that the polyester has a high molecular weight, and it is more preferable that the reaction is carried out until the viscosity of the reaction mixture becomes high. In order to obtain the crystalline polyester being thus polymerized, the molar ratio of the carboxylic acid component to the alcohol component may be adjusted as mentioned above, or reaction conditions such as elevating the reaction temperature, increasing the amount of the catalyst, and/or carrying out dehydration reaction for a long period of time under reduced pressure may be selected. Although the polyester having a high molecular weight of the present invention can be prepared by using a high-input motor, a method of reacting the raw material monomers in the presence of the non-reactive low-viscosity resin and/or the solvent is also an effective means when the crystalline polyester is prepared without especially selecting preparation facilities.

When the crystalline polyester comprises two or more resins, it is desired that at least one resin, preferably all the resins, is the crystalline polyester explained above.

Further, the present invention provides a toner comprising the abovementioned crystalline polyester as a resin binder. The content of the crystalline polyester in the resin binder is preferably from 1 to 40% by weight, more preferably from 5 to 35% by weight, still more preferably from 10 to 30% by weight. It is preferable that the resin binder further comprises an amorphous resin in addition to the crystalline polyester.

The amorphous resin includes amorphous polyesters, amorphous polyester-polyamides, vinyl resins such as amorphous styrene-acrylic resins, hybrid resins, the hybrid resins comprising two or more resin components which preferably are partially chemically bonded to each other, mixtures thereof, and the like. Among them, from the viewpoints of the fixing ability and the compatibility with the crystalline polyester, the amorphous polyesters and hybrid resins comprising an amorphous polyester component and a vinyl resin component are preferable, and the amorphous polyesters are more preferable.

The amorphous polyester can be prepared in the same manner as in the crystalline polyester. Here, in order to prepare an amorphous polyester, it is preferable that the following requirements are met:

1) in a case where monomers for accelerating crystallization of a resin, such as an aliphatic diol having 2 to 6 carbon atoms and an aliphatic dicarboxylic compound having 2 to 8 carbon atoms, are used, crystallization is suppressed by using two or more of these monomers in combination, in each of the alcohol component and the carboxylic acid component, wherein one of these monomers is used in an amount of from 10 to 70% by mol, preferably 20 to 60% by mol of each component, and the monomers are used in combination of two or more, preferably in combination of two to four; or 2) a resin obtained from monomers for accelerating amorphousness of a resin, preferably an alkylene oxide adduct of bisphenol A as an alcohol component, or a substituted succinic acid of which substituent is an alkyl group or alkenyl group as a carboxylic acid component are used in an amount of from 30 to 100% by mol, preferably from 50 to 100% by mol, of the alcohol component or the carboxylic acid component, preferably of the alcohol component and the carboxylic acid component, respectively.

Also, as the raw material monomers for the amorphous polyester-polyamides, in addition to the polyhydric alcohol component and the polycarboxylic acid component described above, in order to form the amide components, polyamines such as ethylenediamine, pentamethylenediamine, hexamethylenediamine, diethylenetriamine, iminobispropylamine, phenylenediamine, xylylenediamine and triethylenetetramine; aminocarboxylic acids such as 6-aminocaproic acid and ε-caprolactam; amino alcohols such as propanolamine; and the like are used. Among them, hexamethylenediamine and ε-caprolactam are preferable.

The amorphous polyester-polyamides can be prepared in the same manner as the amorphous polyester.

In the present invention, the hybrid resin may be obtained by using two or more resins as raw materials, or it may be obtained by using one resin and raw material monomers of the other resin. Further, the hybrid resin may be obtained from a mixture of raw material monomers of two or more resins. In order to efficiently obtain a hybrid resin, those obtained from a mixture of raw material monomers of two or more resins are preferable.

Therefore, it is preferable that the hybrid resin is obtained by mixing raw material monomers for two polymerization resins each having independent reaction paths, preferably raw material monomers for the condensation polymerization resin and raw material monomers for the addition polymerization resin, and carrying out the two polymerization reactions. Specifically, the hybrid resin disclosed in Japanese Patent Laid-Open No. Hei 10-087839 (U.S. Pat. No. 5,908,727) is preferable.

Representative examples of the condensation polymerization resin include polyesters, polyester-polyamides, polyamides, and the like, among which polyesters are preferable. Representative examples of the above-mentioned addition polymerization resin include vinyl resins obtained by radical polymerization, and the like.

The amorphous resin has a softening point of preferably from 70° to 180° C., more preferably from 100° to 160° C., and a glass transition point of preferably from 45° to 80° C., more preferably from 55° to 75° C. Incidentally, glass transition point is a distinct property of an amorphous resin, and is distinguished from the maximum peak temperature of heat of fusion.

Incidentally, in the case where the amorphous resin comprises two or more resins, it is desirable that at least one of them, preferably all of them, is the amorphous resin having the properties described above. Especially, from the viewpoints of the low-temperature fixing ability and the high-temperature offset resistance, it is preferable that a low-softening point resin having a softening point of 70° C. or more and less than 120° C. and a high-softening point resin having a softening point of 120° C. or more and 160° C. or less are used together in a weight ratio (low-softening point resin/high-softening point resin) of preferably from 20/80 to 80/20.

It is preferable that the weight ratio of the crystalline polyester to the amorphous resin (crystalline polyester/amorphous resin) is preferably from 1/99 to 50/50, more preferably from 5/95 to 40/60, especially preferably from 20/80 to 40/60, from the viewpoints of the triboelectric chargeability, the storage property, the low-temperature fixing ability and the durability.

The toner of the present invention may appropriately contain an additive such as a colorant, a charge control agent, a releasing agent, an electric conductivity modifier, an extender, a reinforcing filler such as a fibrous substance, an antioxidant, an anti-aging agent, a fluidity improver, and a cleanability improver.

As the colorant, all of the dyes and pigments which are used as colorants for a toner can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants can be used alone or in admixture of two or more kinds. The toner of the present invention can be used as any of black toners, color toners, and full color toners. The content of the colorant is preferably from 1 to 40 parts by weight, more preferably from 3 to 10 parts by weight, based on 100 parts by weight of the resin binder.

The charge control agent includes positively chargeable charge control agents such as Nigrosine dyes, triphenylmethane-based dyes containing a tertiary amine as a side chain, quatemary ammonium salt compounds, polyamine resins and imidazole derivatives, and negatively chargeable charge control agents such as metal-containing azo dyes, copper phthalocyanine dyes, metal complexes of alkyl derivatives of salicylic acid and boron complexes of benzilic acid.

The releasing agent includes waxes such as natural ester waxes such as carnauba wax and rice wax; synthetic waxes such as polypropylene wax, polyethylene wax and Fischer-Tropsch wax; coal waxes such as montan wax; and alcohol waxes. These waxes may be contained alone or in admixture of two or more kinds. Generally, in order to obtain excellent low-temperature fixing ability, it is preferable that a wax having a relatively low melting point, such as carnauba wax, is used together. In the toner of the present invention, excellent low-temperature fixing ability can be exhibited even when such a wax having a low melting point is used in a small amount.

The toner of the present invention may be prepared by any of conventionally known methods such as a kneading and pulverization method, an emulsion phase-inversion method and a suspension-polymerization method, and a pulverized toner obtained by the kneading and pulverization method is preferable from the viewpoints of easily preparing the toner and markedly exhibiting the effects of the present invention. Incidentally, in the case where a toner is obtained by the kneading and pulverization method, the toner can be prepared by homogeneously mixing a resin binder, a colorant and the like in a mixer such as a Henschel mixer, thereafter melt-kneading with a closed kneader, a single-screw or twin-screw extruder, or the like, cooling, pulverizing, and classifying the product. In the emulsion phase-inversion method, the toner can be prepared by dissolving or dispersing a resin binder, a colorant and the like in an organic solvent, thereafter emulsifying the mixture by adding water, separating the particles, and classifying the particles. Further, a fluidity improver such as hydrophobic silica or the like may be externally added to the surface of the toner as occasion demands. The toner has a volume-average particle size of preferably from 3 to 15 $\mu$m.

The toner comprising the crystalline polyester of the present invention is a toner not only having a low-temperature fixing ability but also having excellent storage property and durability, which are properties usually incompatible with the low-temperature fixing ability ascribed to the crystalline polyester.

The toner of the present invention can be used alone as a developer, in the case where fine magnetic material powder is contained. Alternatively, in the case where fine magnetic material powder is not contained, the toner can be used as a nonmagnetic monocomponent developer, or the toner can be mixed with a carrier and used as a two-component developer. It is preferable to use the toner of the present invention having excellent durability as a two-component developer.

EXAMPLES

The following examples further describe and demonstrate embodiments of the present invention. The examples are given solely for the purpose of illustration and are not to be construed as limitations of the present invention.

[Softening Point]

Softening point refers to a temperature corresponding to ½ of the height (h) of the S-shaped curve showing the relationship between the downward movement of a plunger (flow length) and temperature, namely, a temperature at which a half of the resin flows out, when measured by using a flow tester of the "koka" type ("CFT-500D," commercially available from Shimadzu Corporation) in which a 1 g sample is extruded through a nozzle having a dice pore size of 1 mm and a length of 1 mm, while heating the sample so as to raise the temperature at a rate of 6° C./min and applying a load of 1.96 MPa thereto with the plunger.

[Maximum Peak Temperature of Heat of Fusion and Glass Transition Point]

The maximum peak temperature of heat of fusion is determined using a differential scanning calorimeter ("DSC 210," commercially available from Seiko Instruments, Inc.), by raising its temperature to 200° C., cooling the hot sample to 0° C. at a cooling rate of 10° C./min., and thereafter heating the sample so as to raise the temperature at a rate of 10° C./min. In addition, the glass transition point refers to the temperature of an intersection of the extension of the baseline of equal to or lower than the maximum peak temperature and the tangential line showing the maximum inclination between the kick-off of the peak and the top of the peak by the determination mentioned above.

[Average Molecular Weight of Resin and Content of Polymeric Components Having Molecular Weight of 50000 or More]

The ratio of the polymeric components having a molecular weight of 50000 or more is obtained from the chart showing the molecular weight distribution according to gel permeation chromatography as obtained by the following methods.

1) Preparation of Sample Solution

A resin is dissolved in chloroform so as to have a concentration of 0.5 g/100 ml. Next, this solution was filtered with a fluororesin filter (FP-200, commercially available from Sumitomo Electric Industries, Ltd. having a pore diameter of 0.2 $\mu$m) to exclude an insoluble component, to give a sample solution.

2) Determination of Molecular Weight Distribution

Chloroform is eluted as an eluate at a flow rate of 1 ml per minute to stabilize the column in a thermostat at 40° C. The column was charged with 100 $\mu$l of the sample solution to determine the molecular weight distribution. The molecular weight of the sample is calculated on the basis of a calibration curve previously prepared. The calibration curve at this time is one prepared by using several kinds of monodisperse polystyrenes as standard samples.

Determination Device: CO-8010 (commercially available from Tosoh Corporation)

Analysis Column: GMHLX+G3000HXL (commercially available from Tosoh Corporation)

Preparation Examples of Crystalline Polyesters

The raw material monomers as shown in Tables 1 and 2, 2 g of hydroquinone and 4 g of dibutyltin oxide were combined, and the ingredients were reacted at 160° C. in a nitrogen gas atmosphere over a period of 5 hours. Thereafter, the temperature was raised to 200° C., and the ingredients were reacted for 1 hour and further reacted at 8.3 kPa for 1 hour until a resin having a desired molecular weight was obtained, to give Resins a to i.

TABLE 1

|  | Resin a | Resin b | Resin c | Resin d | Resin e |
|---|---|---|---|---|---|
| 1,4-Butanediol | 1010 g (102) | 812 g (82) | 911 g (92) | 911 g (92) | 911 g (92) |
| 1,6-Hexanediol | — | 260 g (20) | 130 g (10) | 130 g (10) | 130 g (10) |
| Fumaric Acid | 1276 g (100) | 1276 g (100) | 1085 g (85) | 957 g (75) | 638 g (50) |
| Adipic Acid | — | — | 238 g (15) | 396 g (25) | 792 g (50) |
| Number-Average Molecular Weight | 6143 | 6762 | 6485 | 7550 | 7412 |
| Weight-Average Molecular Weight | 1244459 | 3725131 | 3378070 | 5352563 | 5772349 |
| Content of Polymeric Components Having Molecular Weight of 50000 or more (% by weight) | 15.6 | 17.2 | 17.5 | 18.1 | 16.2 |
| Softening Point (° C.) | 139.5 | 128.3 | 117.2 | 97.7 | 71.2 |
| Maximum Peak Temperature (° C.) of Heat of Fusion | 136.3 | 125.4 | 114.9 | 87.1 | 53.5 |
| Softening Point/Peak Temperature | 1.02 | 1.02 | 1.02 | 1.12 | 1.33 |

Note) The values in parentheses are expressed by molar ratios.

TABLE 2

|  | Resin f | Resin g | Resin h | Resin i |
|---|---|---|---|---|
| 1,4-Butanediol | 812 g (82) | 812 g (82) | 812 g (82) | 911 g (92) |
| 1,6-Hexanediol | 260 g (20) | 260 g (20) | 260 g (20) | 130 g (10) |
| Fumaric Acid | 1276 g (100) | 1276 g (100) | 1270 g (100) | 957 g (75) |
| Adipic Acid | — | — | — | 596 g (25) |
| Number-Average Molecular Weight | 6433 | 4720 | 2281 | 5060 |
| Weight-Average Molecular Weight | 160650 | 15317 | 6189 | 17315 |
| Content of Polymeric Components Having Molecular Weight of 50000 or More (% by weight) | 10.3 | 2.5 | 0.2 | 2.1 |
| Softening Point (° C.) | 125.3 | 120.2 | 115.3 | 87.6 |
| Maximum Peak Temperature (° C.) of Heat of Fusion | 124.6 | 124.6 | 124.6 | 95.3 |
| Softening Point/Peak Temperature | 1.01 | 0.96 | 0.92 | 0.92 |

Note) The values in parentheses are expressed by molar ratios.

Preparation Examples of Amorphous Polyesters

The raw material monomers other than trimellitic anhydride as shown in Table 3, and 4 g of dibutyltin oxide were combined, and the ingredients were reacted at 220° C. in a nitrogen gas atmosphere over a period of 8 hours, and then further reacted at 8.3 kPa for 1 hour. Further, trimellitic anhydride was added to the reaction mixture at 210° C., and the ingredients were reacted until the desired softening point was attained, to give Resins A and B.

TABLE 3

|  | Resin A | Resin B |
|---|---|---|
| BPA-PO [1] | 1575 g (90) | 420 g (24) |
| BPA-EO [2] | 163 g (10) | 1235 g (76) |
| Fumaric Acid | 377 g (65) | — |
| Tereplithalic Acid | — | 714 g (86) |
| Trimellitic Anhydride | 366 g (35) | — |
| Softening Point (° C.) | 155.6 | 101.2 |
| Maximum Peak Temperature (° C.) of Heat of Fusion | 67.1 | 62.8 |
| Softening Point/Peak Temperature | 2.32 | 1.61 |
| Glass Transition Point (° C.) | 65.3 | 61.1 |

Note) The values in parentheses are expressed by weight ratios.
[1] Propylene oxide adduct of bisphenol A (2.2 mol)
[2] Ethylene oxide adduct of bisphenol A (2.2 mol)

Examples 1, 3 to 6 and Comparative Examples 1 to 5

A resin binder as shown in Table 4, 4 parts by weight of a carbon black "MOGUL L" (commercially available from Cabot Corporation), 1 part by weight of a charge control agent "T-77" (commercially available from Hodogaya Chemical Co., Ltd.), 1 part by weight of a polypropylene wax "NP-055" (commercially available from MITSUI CHEMICALS, INC.), and 1 part by weight of carnauba wax "Carnauba Wax C1" (commercially available from K. K. Kato Yoko) were sufficiently mixed in a Henschel mixer. The mixture was melt-kneaded using a co-rotating twin-screw extruder (entire length of the kneading portion: 1560 mm; screw diameter: 42 mm; barrel inner diameter: 43 mm) by controlling the rotational speed of the roller to 200 r/min., the heating temperature within the roller to 100° C., and the feeding rate of the mixture to 10 kg/h. The average residence time of the mixture was about 18 seconds. The resulting melt-kneaded product was cooled and roughly pulverized. Subsequently, the resulting product was pulverized with a jet mill and classified, to give a powder having a volume-average particle size of 8.0 μm. To 100 parts by weight of the resulting powder was added 1.0 part by weight of a hydrophobic silica "Aerosil R-972" (commercially available from Nippon Aerosil), and mixed with a Henschel mixer, to give a toner.

Example 2

The same procedures were carried out as in Example 1 except that 1 part by weight of "LR-147" (commercially available from Japan Carlit) was used in place of "T-77," and 4 parts by weight of a cyan pigment "ECB-301" (commercially available from DAINICHISEIKA COLOR & CHEMICALS MFG. CO., LTD.) were used in place of the carbon black, to give a toner.

Test Example 1 [Low-Temperature Fixing Ability]

Four parts by weight of a toner and 96 parts by weight of a silicon-coated ferrite carrier (commercially available from Kanto Denka Kogyo Co., Ltd., average particle size: 90 μm) were mixed for 10 minutes with a turbuler mixer, to give a developer. Next, the resulting developer was loaded in an apparatus of a copy machine "AR-505" (commercially available from Sharp Corporation) which was modified so that fixing could be carried out externally of the device. The development of fixed images was carried out, by sequentially raising the temperature of the fixing roller from 90° to 240° C. in increments of 5° C. The sheets used for the fixing test were "CopyBond SF-70NA" (75 g/m$^2$) commercially available from Sharp Corporation.

A load of 500 g was applied to a sand-rubber eraser, the eraser having a bottom area of 15 mm×7.5 mm, and was moved backwards and forwards five times over a fixed image obtained at each fixing temperature. The optical reflective densities of the image before and after the eraser treatment were measured with a reflective densitometer "RD-915" (manufactured by Macbeth Process Measurements Co.). The temperature of the fixing roller at which the ratio of (a) the optical density after the eraser treatment to (b) the optical density before the eraser treatment, i.e. (a)/(b), for the first time exceeds 70%, is defined as the lowest fixing temperature. The low-temperature fixing ability was evaluated according to the following evaluation criteria. The results are shown in Table 4.

[Evaluation Criteria]
○: A lowest fixing temperature being lower than 130° C.;
Δ: A lowest fixing temperature being 130° C. or higher and lower than 140° C.;
x: A lowest fixing temperature being 140° C. or higher and lower than 150° C.;
xx: A lowest fixing temperature being 150° C. or higher.

Test Example 2 [Durability]

Four parts by weight of a toner and 96 parts by weight of a silicon-coated ferrite carrier (commercially available from Kanto Denka Kogyo Co., Ltd., average particle size: 90 μm) were mixed for 10 minutes with a turbuler mixer, to give a developer. Next, the resulting developer was loaded in a modified apparatus of a copy machine "AR-505" (commercially available from Sharp Corporation) (printing speed: 70 sheets/minute on A4 sheets (210 cm×297 cm), and continuous printing of 100000 sheets of an A4 size with a 5% blackened ratio was carried out. Thereafter, the amount of toner spent to the carrier was determined by using TOC (model: EMIA-110, commercially available from Horiba, LTD.), and the durability was evaluated according to the following evaluation criteria. The results are shown in Table 4.

[Evaluation Criteria]
○: An amount of toner spent being less than 0.05% by weight;
Δ: An amount of toner spent being 0.05% by weight or more and less than 0.10% by weight;
x: An amount of toner spent being 0.10% by weight or more and less than 0.15% by weight;
xx: An amount of toner spent being 0.15% by weight or more.

Test Example 3 [Storage Property]

Four grams of a toner were charged in a container having a diameter of 30 mm and a height of 55 mm, and allowed to stand under environmental conditions at a temperature of 55° C. and a relative humidity of 60% for 120 hours. The extent of aggregation of the toner was visually observed, and the storage property was evaluated according to the following criteria. The results are shown in Table 4.

[Evaluation Criteria]
○: No aggregation being observed at all;
Δ: Hardly any aggregation being observed;
x: Obvious aggregation being observed; and
xx: Aggregation already being observed after allowing the toner to stand for 24 hours.

TABLE 4

| | Resin Binder | Low-Temperature Fixing Ability | Durability | Storage Property |
|---|---|---|---|---|
| Ex. 1 | b/A/B = 20/50/30 | ○ | ⊙ | ⊙ |
| Ex. 2 | b/A/B = 20/50/30 | ○ | ⊙ | ⊙ |
| Ex. 3 | a/A/B = 20/50/30 | Δ | ⊙ | ⊙ |
| Ex. 4 | c/A/B = 20/50/30 | ○ | ⊙ | ○ |
| Ex. 5 | d/A/B = 20/50/30 | ⊙ | ○ | ○ |
| Ex. 6 | f/A/B = 20/50/30 | ○ | ○ | ○ |
| Comp. Ex. 1 | e/A/B = 20/50/30 | ⊙ | ○ | x |
| Comp. Ex. 2 | g/A/B = 20/50/30 | ○ | x | x |
| Comp. Ex. 3 | h/A/B = 20/50/30 | ○ | x | xx |
| Comp. Ex. 4 | i/A/B = 20/50/30 | ⊙ | x | xx |
| Comp. Ex. 5 | A/B = 50/50 | x | ⊙ | ⊙ |

Note) The amounts used are expressed by parts by weight.

It can be seen from the above results that the toners of Examples 1 to 6 have excellent low-temperature fixing ability, and excellent storage property and durability, which are properties usually incompatible with the low-temperature fixing ability, as compared to Comparative Examples 1 to 4 using crystalline polyesters not having desired properties. Also, the toner of Comparative Example 5 not using a crystalline polyester lacks low-temperature fixing ability even though the toner is excellent in storage property and durability.

Advantages of the present invention include a crystalline polyester which keeps the low-temperature fixing ability of the toner, and is capable of exhibiting excellent properties in its storage property and durability when the crystalline polyester is used as a resin binder for a toner. The present invention also relates to a toner comprising the crystalline polyester.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A crystalline polyester having a number-average molecular weight of from 5000 to 10000, a weight-average molecular weight of from 150000 to 8000000, a maximum peak temperature of heat of fusion of from 60° to 150° C., and a ratio of a softening point to a maximum peak temperature of heat of fusion (softening point/peak temperature) of from 0.6 to 1.3.

2. The crystalline polyester according to claim 1, wherein the crystalline polyester has a number-average molecular weight of from 5500 to 9000, a weight-average molecular weight of from 300000 to 6000000, a maximum peak temperature of heat of fusion of from 80° to 140° C., and a ratio of a softening point to a maximum peak temperature of heat of fusion (softening point/peak temperature) of from 0.9 to 1.2.

3. The crystalline polyester according to claim 1, wherein the crystalline polyester comprises 10% by weight or more of a polymeric component having a molecular weight of 50000 or more.

4. The crystalline polyester according to claim 1, wherein the crystalline polyester comprises 10 to 30% by weight of a polymeric component having a molecular weight of 50,000 or more.

5. The crystalline polyester according to claim 1, which is obtained by polycondensing an alcohol component and a carboxylic acid component, wherein a molar ratio of the carboxylic acid component to the alcohol component (carboxylic acid component/alcohol component) is 0.9 or more and less than 1.0.

6. The crystalline polyester according to claim 5, wherein the carboxylic acid component comprises 60% by mol or more of an aliphatic dicarboxylic acid compound having 2 to 8 carbon atoms.

7. The crystalline polyester according to claim 5, wherein one aliphatic dicarboxylic acid compound occupies 60% by mol or more of the carboxylic acid component.

8. The crystalline polyester according to claim 5, wherein the alcohol component comprises 60% by mol or more of an aliphatic diol having 2 to 6 carbon atoms.

9. The crystalline polyester according to claim 5, wherein one aliphatic diol occupies 70% by mol or more of the alcohol component.

10. A toner comprising the crystalline polyester as defined in claim 1 as a resin binder.

11. The toner according to claim 10, wherein the crystalline polyester is contained in an amount of from 1 to 40% by weight of the resin binder.

12. The toner according to claim 10, wherein the resin binder further comprises an amorphous resin having a ratio of a softening point to a maximum peak temperature of heat of fusion (softening point/peak temperature) of more than 1.3 and 4.0 or less.

13. The toner according to claim 12, wherein the amorphous resin is at least one member selected from the group consisting of an amorphous polyester, an amorphous polyester-polyamide, a vinyl resin, and a hybrid resin comprising two or more resin components.

14. The toner according to claim 12, wherein the amorphous resin has a softening point of from 70° to 180° C.

15. The toner according to claim 12, wherein a weight ratio of the crystalline polyester to the amorphous resin (crystalline polyester/amorphous resin) is from 1/99 to 50/50.

16. The toner according to claim 10, wherein the toner is a pulverized toner obtained by a kneading and pulverization method.

* * * * *